(12) United States Patent
Massarsky

(10) Patent No.: US 6,385,628 B1
(45) Date of Patent: May 7, 2002

(54) METHOD FOR SIMULATING THE CREATION IF AN ARTIST'S DRAWING OR PAINTING OF A CARICATURE, AND DEVICE FOR ACCOMPLISHING SAME

(75) Inventor: Yefim Massarsky, Newton, MA (US)

(73) Assignee: Foto Fantasy, Inc., Windham, NH (US)

( * ) Notice: Subject to any disclaimer, the term of this patent is extended or adjusted under 35 U.S.C. 154(b) by 0 days.

(21) Appl. No.: 09/258,922

(22) Filed: Mar. 1, 1999

Related U.S. Application Data

(63) Continuation-in-part of application No. 08/961,780, filed on Oct. 31, 1997, now Pat. No. 6,021,417.

(51) Int. Cl.⁷ .............................................. G06F 17/21
(52) U.S. Cl. ........................ 707/502; 345/441; 396/2
(58) Field of Search ........................ 707/502; 345/441, 345/619, 845, 85; 396/2

(56) References Cited

U.S. PATENT DOCUMENTS

| | | | | |
|---|---|---|---|---|
| 4,695,142 A | * | 9/1987 | Holt | 355/20 |
| 5,072,246 A | * | 12/1991 | Thayer et al. | 296/2 |
| 5,109,281 A | * | 4/1992 | Kobori et al. | 358/296 |
| 5,117,283 A | * | 5/1992 | Kroos et al. | 358/22 |
| 5,196,876 A | * | 3/1993 | Thayer | 396/2 |
| 5,216,755 A | * | 6/1993 | Walker et al. | 345/591 |
| 5,343,386 A | * | 8/1994 | Barber | 700/90 |
| 5,345,313 A | * | 9/1994 | Blank | 348/598 |
| 5,469,536 A | * | 11/1995 | Blank | 345/596 |
| 5,513,991 A | * | 5/1996 | Reynolds et al. | 434/81 |
| 5,539,453 A | * | 7/1996 | David et al. | 348/77 |
| 5,617,138 A | * | 4/1997 | Ito et al. | 348/222 |
| 5,621,868 A | * | 4/1997 | Mizutani et al. | 345/595 |
| 5,647,796 A | * | 7/1997 | Cohen | 463/1 |
| 5,687,304 A | * | 11/1997 | Kiss | 345/419 |
| 5,696,995 A | * | 12/1997 | Huang et al. | 396/2 |
| 5,767,860 A | * | 6/1998 | Zimmer et al. | 345/441 |
| 5,897,220 A | * | 4/1999 | Huang et al. | 396/2 |
| 5,991,057 A | * | 11/1999 | Goldstein | 359/32 |

* cited by examiner

*Primary Examiner*—Stephen S. Hong
(74) *Attorney, Agent, or Firm*—Mirick, O'Connell, DeMallie & Lougee, LLP

(57) ABSTRACT

The present invention teaches a method of creating a caricature of an image taken of or provided by a user at a photobooth. The invention provides an image fixing device, fixes the image at the photobooth with the image fixing device, assigns a first set of control points at predetermined locations on the fixed image, establishes a distance between the control points, alters the distance between at least two of the control points, defines a second set of control points which incorporates the altered distances, and renders the caricature in a visible format using the second set of control points. Also disclosed is a device for accomplishing the methods of this invention.

31 Claims, 9 Drawing Sheets

METHOD FOR SIMULATING THE CREATION IF AN ARTIST'S DRAWING OR PAINTING OF A CARICATURE, AND DEVICE FOR ACCOMPLISHING SAME

CROSS-REFERENCE

This is a continuation-in-part of U.S. application Ser. No. 08/961,780 filed on Oct. 31, 1997 now U.S. Pat. No. 6,021,417 issued On Feb. 1, 2000.

FIELD OF THE INVENTION

This invention relates to photobooths and other similar vending machines and the methods used to simulate the creation of an artist's drawing or painting of a caricature of an image taken of and/or provided by the user at the machine.

BACKGROUND OF THE INVENTION

Vending machines and more specifically self-photography booths are well known in the art. Self-photography booths capable of producing a composite image from a live image superimposed on a background stored in a computer at the booth are also known in the art. However, none of the self-photography booths thus far offers a caricature as the final image or a visual simulation of the gradual process by which an artist would paint or draw such a caricature. Enabling a photobooth to simulate an artist's gradual creation of a caricature adds commercial value to the photobooth and provides the user with a unique form of entertainment in addition to a hardcopy of the final image.

SUMMARY OF THE INVENTION

Therefore the object of the invention is to provide a method of creating a caricature of an image taken of or provided by the user at a photobooth.

It is a further object of the invention to provide a method of simulating the creation of an artist's drawing or painting of a caricature.

It is a further object of the invention is to provide a device which creates a caricature of an image taken of or provided by the user at a photobooth.

It is a further object of the invention to provide a device which simulates the creation of an artist's drawing or painting of a caricature.

The preferred method of the invention of creating a caricature of an image taken of or provided by a user at a photobooth, comprises the steps of: providing an image fixing device; fixing the image at the photobooth with the image fixing device; assigning a first set of control points at predetermined locations on the fixed image; establishing a distance between the control points; altering the distance between at least two of the control points; defining a second set of control points which incorporates the altered distances; and rendering the caricature in a visible format using the second set of control points.

The method of the invention of creating a caricature of an image taken of or provided by a user at a photobooth, may further comprise the steps of creating a retrievable copy of the rendered caricature and delivering the copy to the user.

The rendering step preferably comprises the steps of: providing a computer monitor; translating the fixed image, in response to the second set of control points, into computer instructions capable of creating a mock artist's drawing or painting of the caricature on the computer monitor; generating and displaying on the monitor an icon which simulates drawing or painting the mock artist's drawing or painting of the caricature; and using the instructions to move the icon about the monitor, wherein the mock artist's drawing or painting of the caricature is created gradually as the icon moves, to simulate the process by which the mock artist may draw or paint the caricature. The translating step may include determining a display parameter value of pixels of the fixed image; substituting the stored display textures for portions of the fixed image; and/or dividing the determined display parameter values into groups. The groups preferably represent contiguous portions of a digital grey scale spectrum. The method may further include creating a plurality of visible textures; and/or electronically storing a plurality of display textures for use in creating the caricature. The step of electronically storing may also include scanning the created textures into a computer memory. The using step preferably includes displaying on the monitor the substituted display textures in the areas of the display corresponding to the substituted portions of the fixed image.

The displaying step preferably includes gradually creating on the monitor the substituted display textures while moving the icon across the monitor in a predetermined movement pattern. The predetermined movement pattern may be accomplished in one area of the display corresponding to the substituted portions of the fixed image at a time. The step of gradually creating on the monitor the substituted display textures may include creating the display textures along the path on which the icon traverses the monitor, as the icon traverses the monitor.

In the preferred method of the invention of creating a caricature of an image taken of or provided by a user at a photobooth, the step of generating and displaying an icon includes providing and displaying a plurality of drawing icons, and providing a means for a user to select one the drawing icon. Further the instructions capable of creating the caricature preferably include division of the fixed image into a plurality of separate image areas, each the image area corresponding generally to contiguous image areas of approximately the same display parameter value. The instructions to move the icon across the monitor may also include moving the icon across the monitor in a predetermined movement pattern which is preferably accomplished in the plurality of separate image areas, in one image area at a time.

The altering step of the preferred method, of creating a caricature of an image taken of or provided by a user at a photobooth, preferably includes the step of generating an inverse transform.

In another preferred method, of creating a caricature of an image taken of or provided by a user at a photobooth, the rendering step comprises the steps of, electronically storing a plurality of display textures for use in creating the caricature; translating the fixed image into instructions capable of creating the caricature, including determining a display parameter value for the pixels of the fixed image, and dividing the determined values into groups, in which the groups represent contiguous portions of a display parameter scale spectrum; and in which the translating step further includes substituting the stored display textures for portions of the fixed image; generating and displaying on the monitor an icon which simulates drawing or painting the caricature; and using the instructions to move the icon across the monitor, wherein the caricature is created gradually as the icon moves across the monitor, to simulate the process by which an artist may create the caricature.

In yet another preferred method of the invention, of creating a caricature of an image taken of or provided by a user at a photobooth, the rendering step comprises the steps of, electronically storing a plurality of display textures for use in creating the caricature; translating the fixed image into instructions capable of creating the caricature, including determining the grey scale value of pixels of the fixed image, dividing the determined grey scale values into groups, and in which the translating step includes substituting said stored display textures for portions of the fixed image; generating and displaying on the monitor an icon which simulates drawing or painting the caricature; and using the instructions to move the icon across the monitor, wherein the caricature is created gradually as the icon moves across the monitor, to simulate the process by which an artist may create the caricature, including displaying on the monitor the substituted display textures in the areas of the display corresponding to the substituted portions of the fixed image, and in which displaying on said monitor the substituted display textures includes gradually creating on the monitor the substituted display textures, and in which gradually creating the substituted display textures includes moving the icon across the monitor in a predetermined movement pattern, in which the predetermined movement pattern is accomplished in one area of the display corresponding to the substituted portions of the fixed image at a time, and further in which gradually creating on the monitor the substituted display textures includes creating said display textures along the path on which the icon traverses the monitor, as the icon traverses the monitor.

In yet another preferred method of the invention, of creating a caricature of an image taken of or provided by a user at a photobooth, the rendering step comprises the steps of, translating the fixed image into instructions capable of creating the caricature; using the instructions to gradually create the caricature on the monitor, in separate discrete portions of the monitor one at a time, to simulate the process by which an artist may create the caricature.

The preferred embodiment of the photography booth of the invention, for creating a printed output of a caricature, comprises: a printer; a computer with memory; means for storing a plurality of drawing textures; means fixing an image at the photobooth; means for assigning a first set of control points at predetermined locations on the fixed image; means for establishing a distance between the control points; means for altering the distance between at least two of the control points; means for defining a second set of control points which incorporates the altered distances; and means for printing the caricature using said second set of control points.

Another preferred embodiment of the photography booth of the invention, for creating an output of a mock artist's drawing or painting of a caricature, comprises: a computer with memory; means for storing a plurality of drawing textures; means fixing an image at the photobooth; means for assigning a first set of control points at predetermined locations on the fixed image; means for establishing a distance between the control points; means for altering the distance between at least two of the control points; means for defining a second set of control points which incorporates the altered distances; means for substituting one or more of the stored textures for different areas of the fixed image, in response to the second set of control points, to create an electronic mock artist's drawing or painting of the caricature; and means for creating a stored version of the mock artist's drawing or painting of said caricature, using the second set of control points, on a portable machine-readable memory device and delivering the stored version to the user as a record of the caricature.

The preferred embodiments of the photobooth of the invention may further include a monitor and a means for displaying on the monitor a gradual process of creating said caricature; a means for creating a stored version of the gradual process on the portable, machine-readable memory device; and a means for dispensing to the user the portable, machine-readable memory device.

Yet another preferred embodiment of the photography booth of the invention, for creating an output of a mock artist's drawing or painting of a caricature, comprises: a computer with memory; means for storing a plurality of drawing textures; means fixing an image at the photobooth; means for assigning a first set of control points at predetermined locations on the fixed image; means for establishing a distance between the control points; means for altering the distance between at least two of the control points; means for defining a second set of control points which incorporates the altered distances; means for substituting one or more of the stored textures for different areas of the fixed image, in response to the second set of control points, to create an electronic mock artist's drawing or painting of the caricature; and a hard copy output device and means for providing the electronic artist's drawing or painting of the caricature to the output device, using the second set of control points, to create a hard copy of the caricature. The hard copy output device may be a computer printer, an engraver or an etcher.

BRIEF DESCRIPTION OF THE DRAWINGS

Other objects, features and advantages will occur to those skilled in the art from the following description of a preferred embodiment, and the accompanying drawings, in which.

DESCRIPTION OF THE PREFERRED METHOD AND EMBODIMENT

The method of the invention of creating a caricature of an image taken of or provided by a user at a photobooth, is generally accomplished using the steps of: providing an image fixing device; fixing the image at the photobooth with the image fixing device; assigning a first set of control points at predetermined locations on the fixed image; establishing a distance between the control points; altering the distance between at least two of the control points; defining a second set of control points which incorporates the altered distances; and rendering the caricature in a visible format using the second set of control points.

In the rendering step, the fixed image is translated, using the second set of control points, into computer instructions capable of creating the desired displayed and/or printed mock artist's drawing or painting of the caricature. An icon is preferably displayed on the monitor on which the caricature is to be created. The instructions are then used to move the icon across the monitor, and the caricature is created gradually following the path followed by the icon, to simulate a sketch or painting created by an artist's hand. The completed caricature may then be printed as a hard copy for the user to save. Alternatively, the caricature can be created by the computer and simply provided as a hard copy output, such as a printed paper or engraved wood or metal piece, and/or an electronically-stored format such as CD ROM, disk, or computer or video tape.

Figure 1:
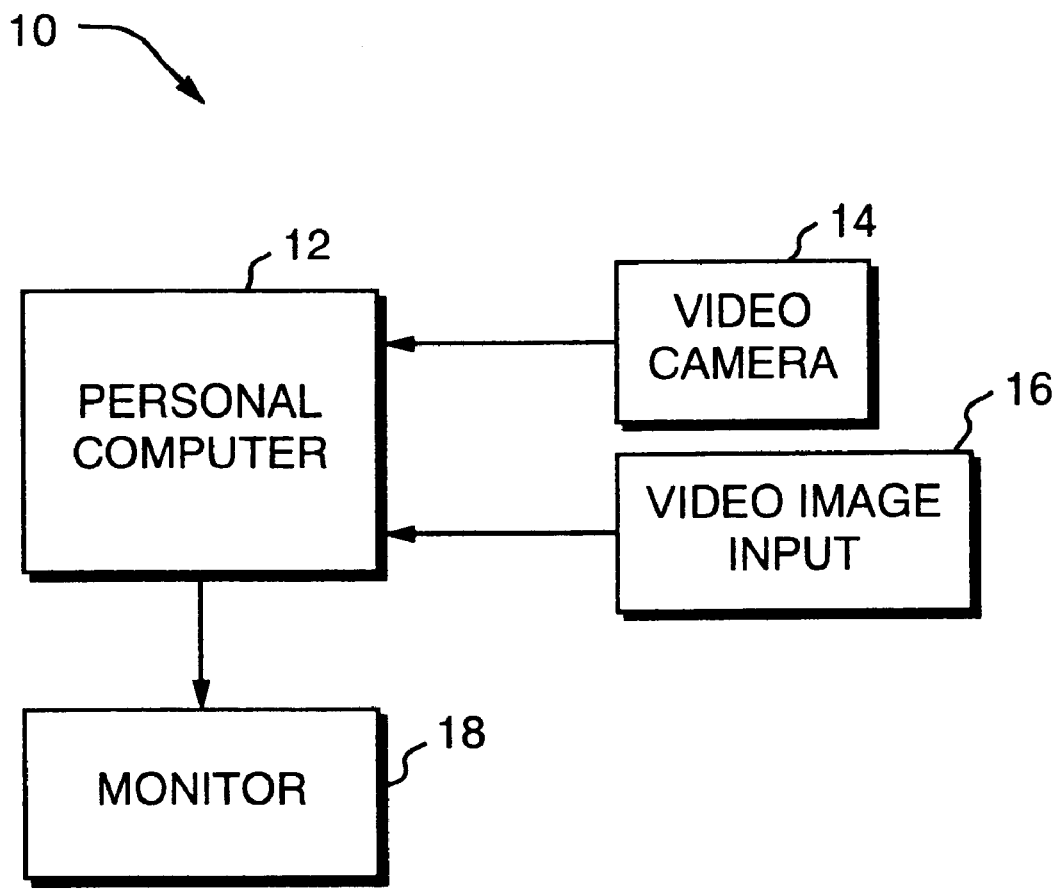
FIG. 1 is a simplified schematic diagram of a system of this invention capable of accomplishing the methods of this invention.

FIG. 1 is a simplified schematic diagram of system 10 of this invention, which may be used to accomplish the methods of this invention. Personal computer 12 has memory, typically in the form of a hard drive or RAM as appropriate depending on the computer and the size of the file. An electronic image to be recreated in this invention is received into the memory. The image may be provided by video camera 14, which can capture either a live image or an image of a photograph placed in front of the video camera, or the image can be input to computer 12 as a digital file 16. Personal computer 12 has a standard video grabber board such as a Flashpoint by Integral Technologies.

Figure 3:
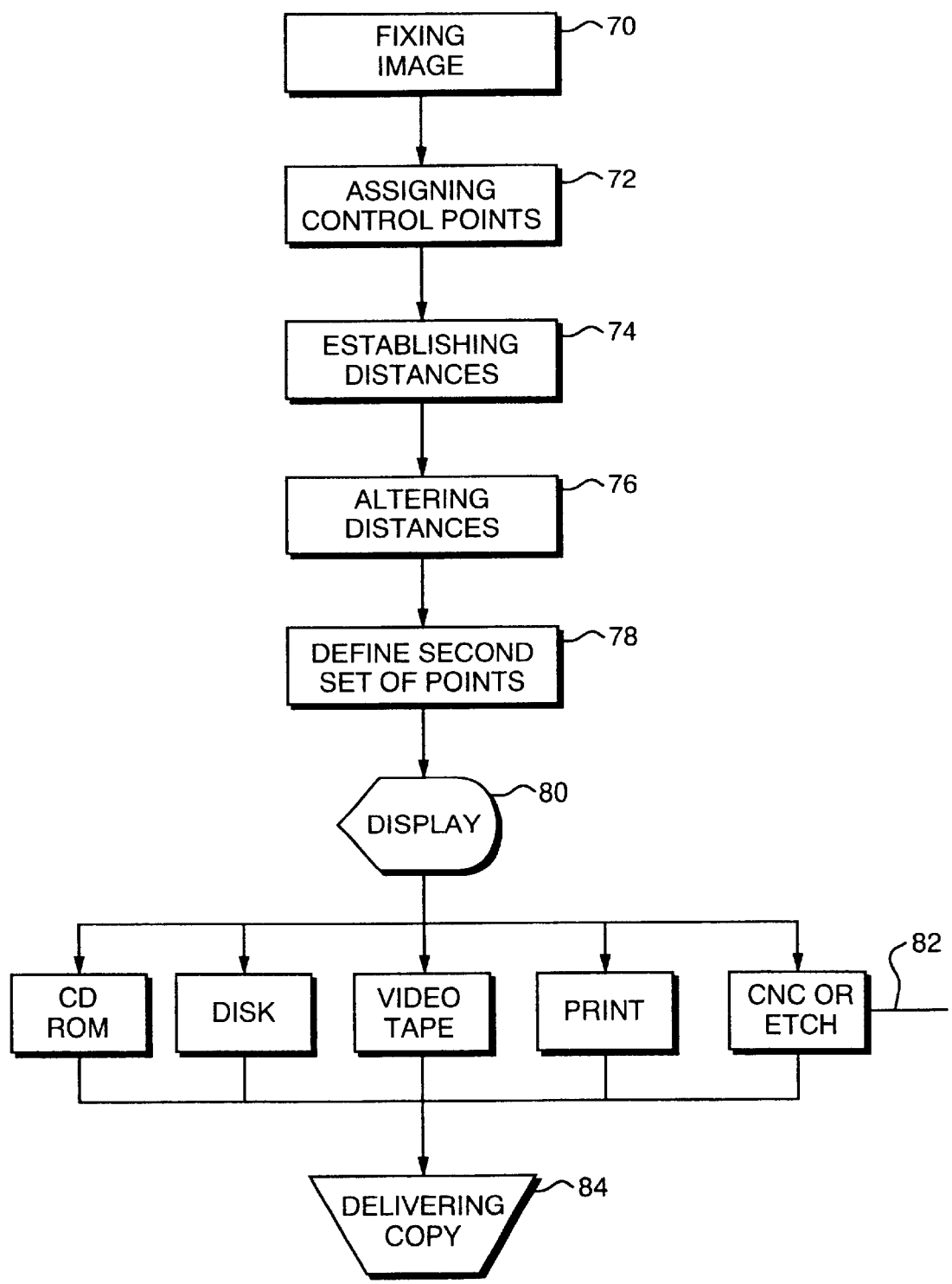
FIG. 3 is a schematic diagram of the preferred method of this invention.
Figure 4:
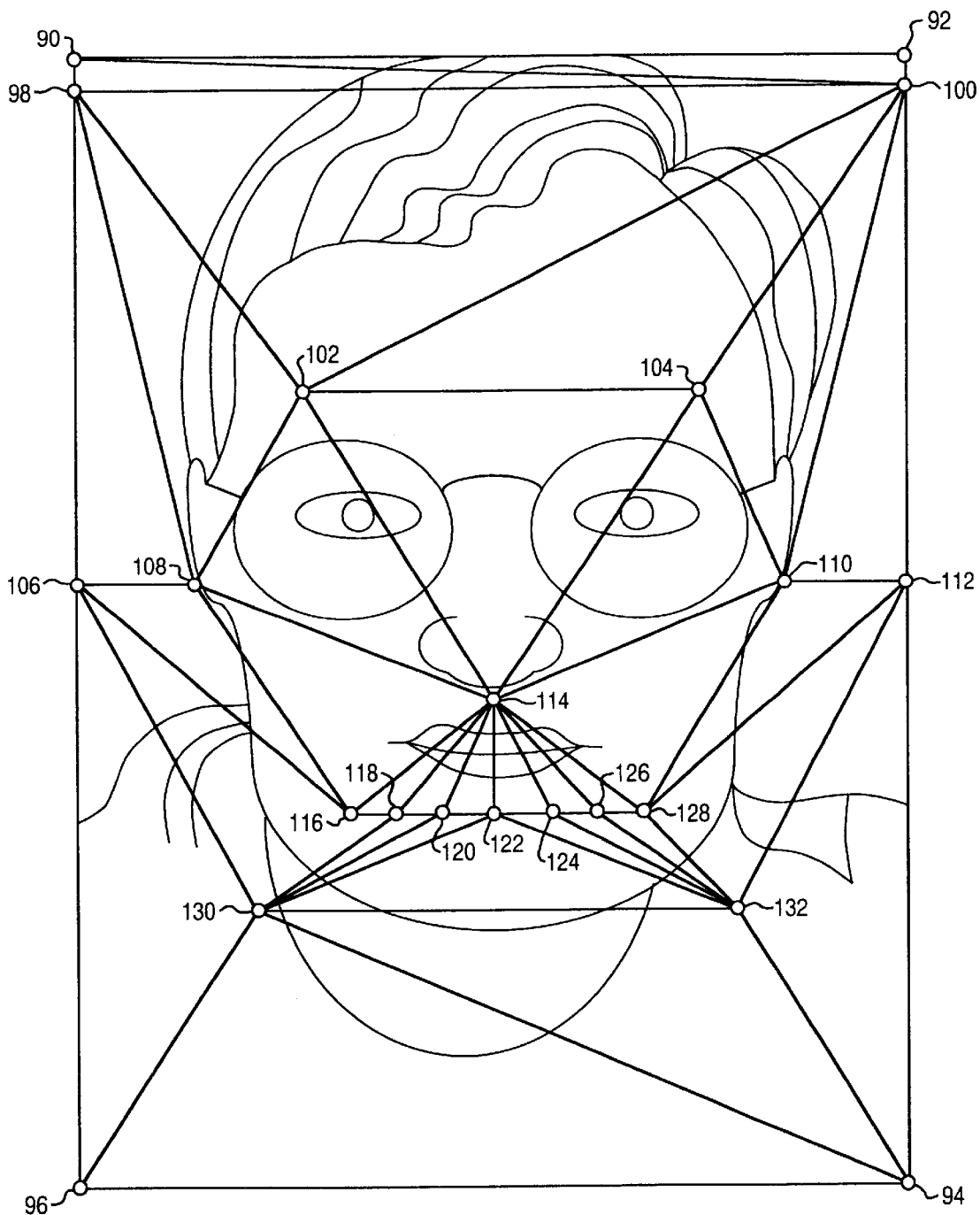
FIG. 4. is exemplary of a manner of assigning a first set of control points on a fixed image and establishing a distance between the control points, for use in this invention.

As shown in FIG. 3, the method of the invention, which in part utilizes software resident in computer 12, generally, fixes the image in step 70; assigns a set of control points at critical locations in step 72 on the image captured by video camera 14; establishes a distance between the assigned control points in step 74; alters the established distances between at least two control points in step 76; and defines a second set of control points in step 78 which incorporates the altered distances. The image area is partitioned into triangular sub-regions. The partitioning is accomplished under the direction of a set of "control points". FIG. 4 show a pattern of triangles that result from an example set of control points.

The specific triangle selection is not absolutely critical, as long as a few simple criteria are met. First, every triangle vertex is a control point. Second, all control points must have at least three adjacent triangles. Third, no polygon contained within the image has more than three vertices. For triangulation purposes the four corners of the image act as implied control points.

Each image sub-region is altered in shape, position and alignment by a simple repositioning of the triangle vertices. The image sub-region contained within the triangle is stretched and moved in accordance with the change in the bounding triangle. The process creates the visual appearance of the caricature, which is then displayed on monitor 18 in step 80. The method may further include steps 82 and 84 in which a retrievable copy of the caricature is created and the copy is delivered to the user via chute 161 or 163 shown in FIG. 2B.

In steps 72, 74, 76 and 78, the method of the invention utilizes software based on a technique known in the art as polynomial warping. The preferred method works backward from the warped image to locate the source of each pixel. For each triangle in the resulting warped image, the method locates the corresponding pixels (picture elements) in the original source image (the camera input) and copies them to their changed locations. The method applies two-dimensional bilinear interpolation when reading the source pixels to obtain a higher quality image.

As shown in FIG. 4, a pattern of triangles are mapped out on the captured images. A lattice of control points is assigned according to where the vertices of the mapped triangles are located, and the distance between adjacent control points or vertices is established. The different sets of control points are chosen by an artist with knowledge of the warping process in anticipation of the visual effect produced. The preferred embodiment chooses visual transformations that are visually identifiable to customers as facial features or facial expressions expressing recognizable moods.

The control points could also be selected automatically under program control. One possible implementation would try to identify facial features contained within the image, would look for facial attributes that diverge from the norm, would assign control points in relation to these diverging facial attributes, and would choose transformations to emphasize these attributes. The attributes checked and highlighted by the method would be predetermined and stored within the program.

Figure 5:
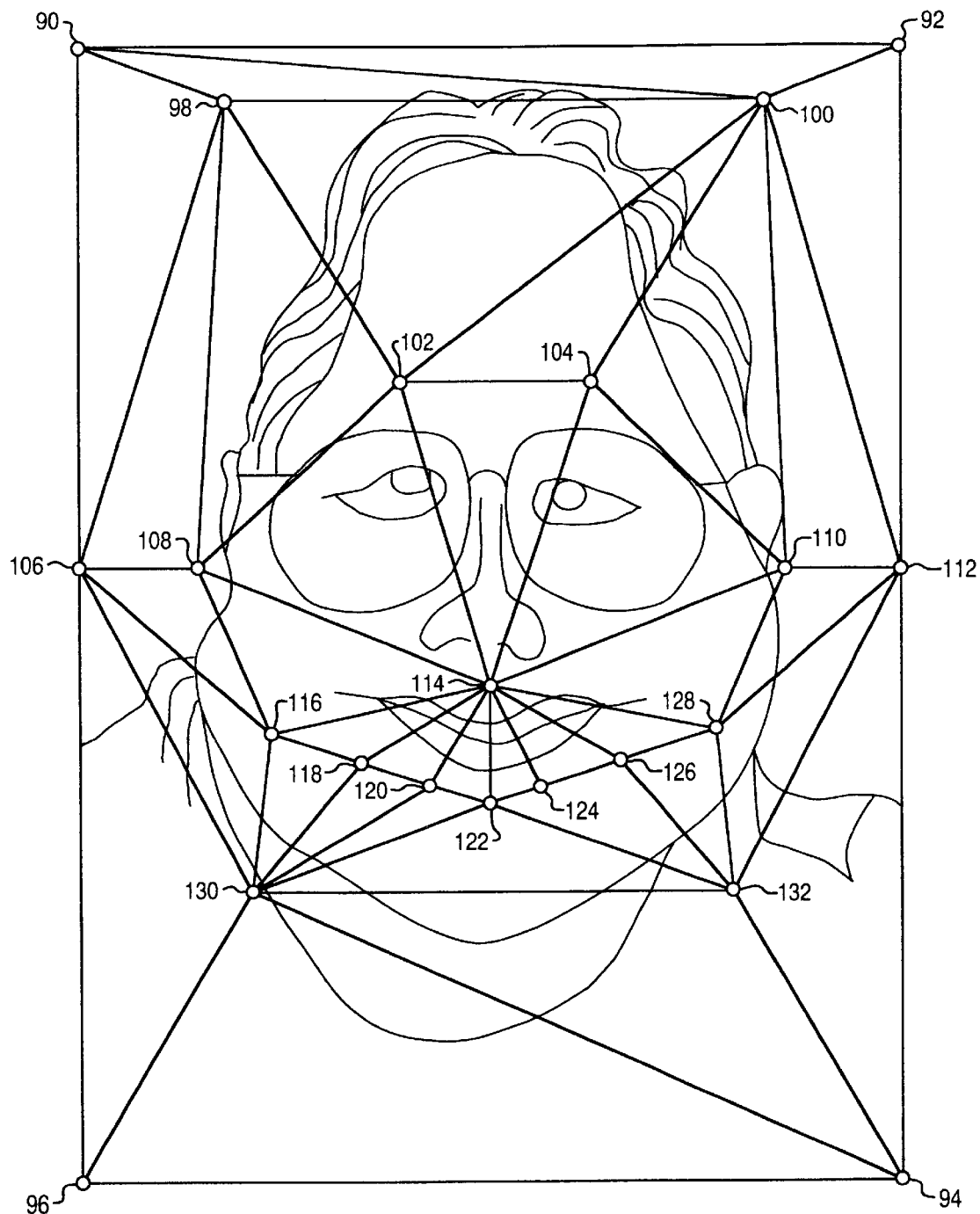
FIG. 5 is exemplary of a manner of altering the distance between at least two control points and defining a second set of control points which incorporates the altered distances.

For example, FIG. 4 illustrates an image captured by video camera 14 on which appears a predetermined pattern of adjacent triangles, the vertices of which will determine the control points. The image shown in FIG. 4 comprises a total of 34 triangles which together form 22 control points, specifically, control points 90–132. As shown, each triangle shown has two or more vertices than are common with one or more adjacent triangles. As such, when the distance between two control points is altered, the dimensions of two or more adjacent triangles are in turn altered as well, as shown in FIG. 5.

The warping effect is accomplished by increasing or decreasing the distance between two or more predetermined control points, in effect, reassigning or moving predetermined control points to a new location. In the example shown in FIGS. 4 and 5, the location of control points 98, 100, 102, 104, 116, 118, 120, 124, 126 and 128 is changed. Both the reassigned control points (98, 100, 102, 104, 116, 118, 120, 124, 126 and 128) and the control points which remain in their originally assigned location (90, 92, 94, 96, 106, 108, 110, 112, 114, 122, 130 and 132) are used to define a second set of control points from which the final caricature is processed. As noted above, the preferred method of warping generates an inverse transform. As such, the preferred method maps out the image of FIG. 5 and works backward from the control points of FIG. 5 to the control points of FIG. 4 to calculate the destination address. For example, control points 102 and 104, as shown in FIG. 5, have been reassigned a new address, as shown in FIG. 4, thus increasing the distance between points 102 and 104. Increasing the distance between points 102 and 104 effectively changes the size and shape of the seven triangles of which control points 102 and 104 are common vertices. Therefore, the source pixels located within triangle 100, 102, 104, as shown in FIG. 4, are reassigned and condensed to fill the destination pixels in corresponding triangle 100, 102 and 104, as shown in FIG. 5.

It is envisioned that the method of the invention may be further or alternatively configured to rotate, scale or translate the captured image into an altered image. The method may also use another technique for warping an image known as morphing which utilizes higher-ordered polynomials and combines or otherwise superimposes two or more images.

Figure 8:
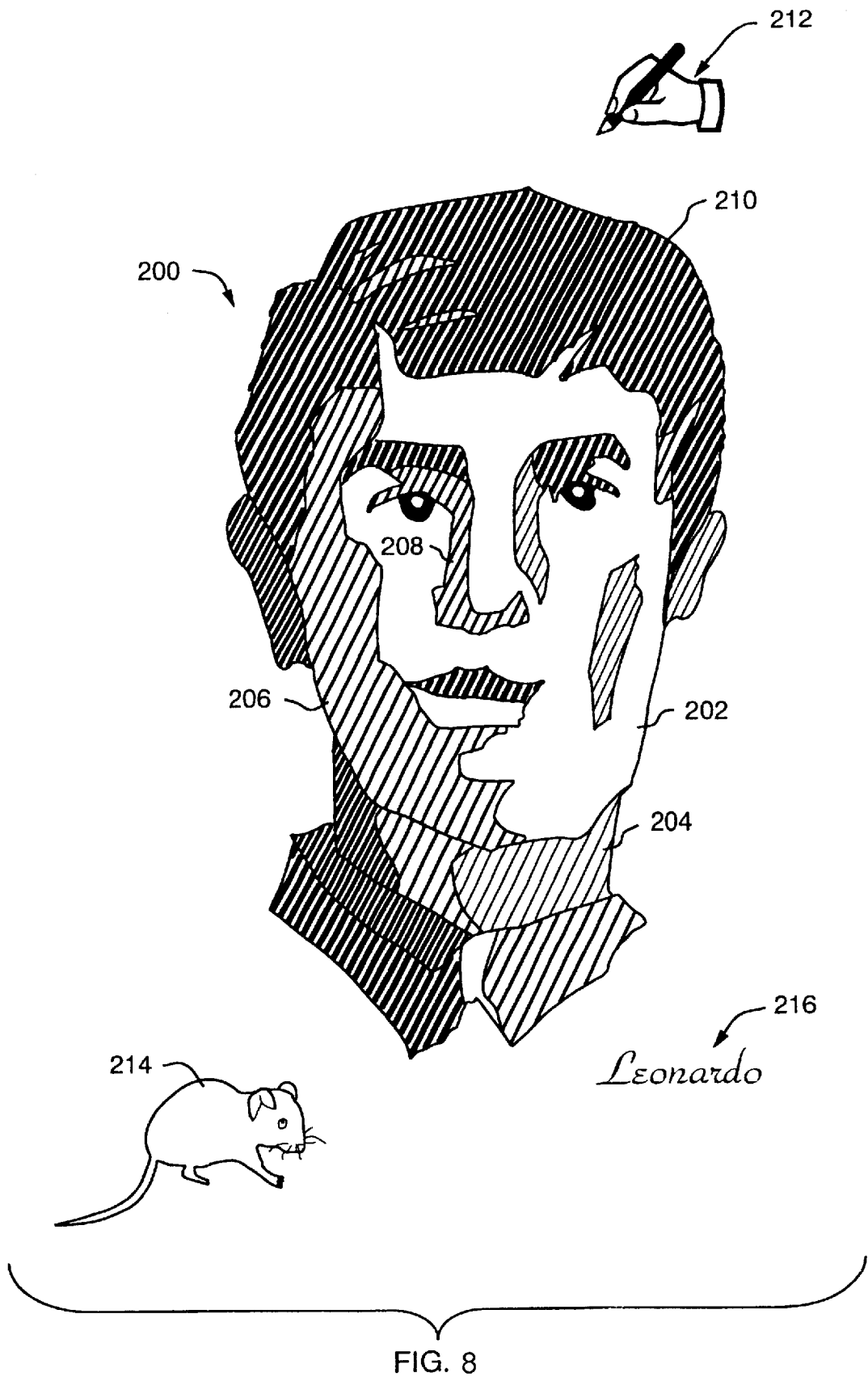
FIG. 8 is a simplified example of the monitor of FIGS. 1 and 2 during or just at the completion of the creation of the mock artist drawing or painting according to the method of this invention.

The software may also be configured to generate and display on monitor 18 an icon which is used to simulate the drawing or painting of the mock output image of the caricature. The software translates an electronically-stored image of the caricature into instructions capable of creating a mock image. These instructions are used to move the icon across the monitor. The image is created gradually in the path which the icon follows, to simulate the drawing or painting of the image by the icon. The icon can take any desired shape, for example an artist's hand with a pencil or paintbrush, or a more fantastic image such as an animal or other object which moves about monitor 18 as shown in FIG. 8.

Figure 2A:
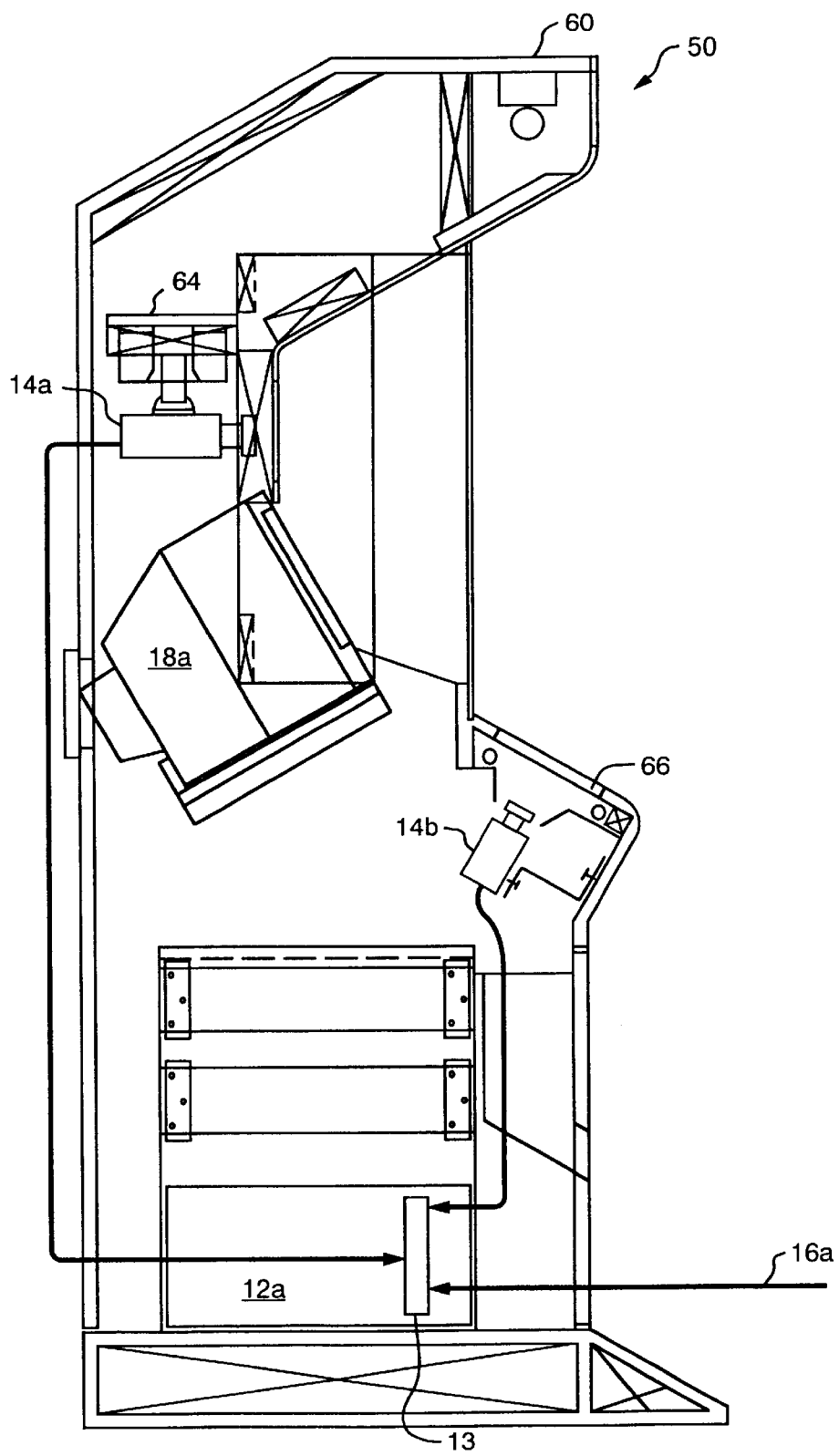
FIG. 2A is a cross-sectional schematic view of a photo booth which accomplishes the system of FIG. 1.

The method of FIG. 3 and the system of FIG. 1 may be accomplished in a free-standing self-photography booth such as booth 50, FIG. 2A. Booth 50 includes video camera 14a with positioning device 64 which may be controlled by a user, not shown, standing or sitting in front of camera 14a to capture a live image of the user. Booth 50 is also shown as including second video camera 14b which is pointed at glass plate 66 on which may be placed a photograph which the user desires to have translated into a mock artist's drawing or painting image. It is also possible to include another image input source 16a, which could be accomplished with a modem or other connect device to allow the input of an electronic image file.

The desired video input is routed to video board 13 of personal computer 12a. Software resident in computer 12a directs the creation of the mock artist drawing or painting image on monitor 18a. When the image creation process is complete, the image may be printed out with a standard printer such as a Hewlett Packard laser printer, not shown in the drawing.

Figure 2B:
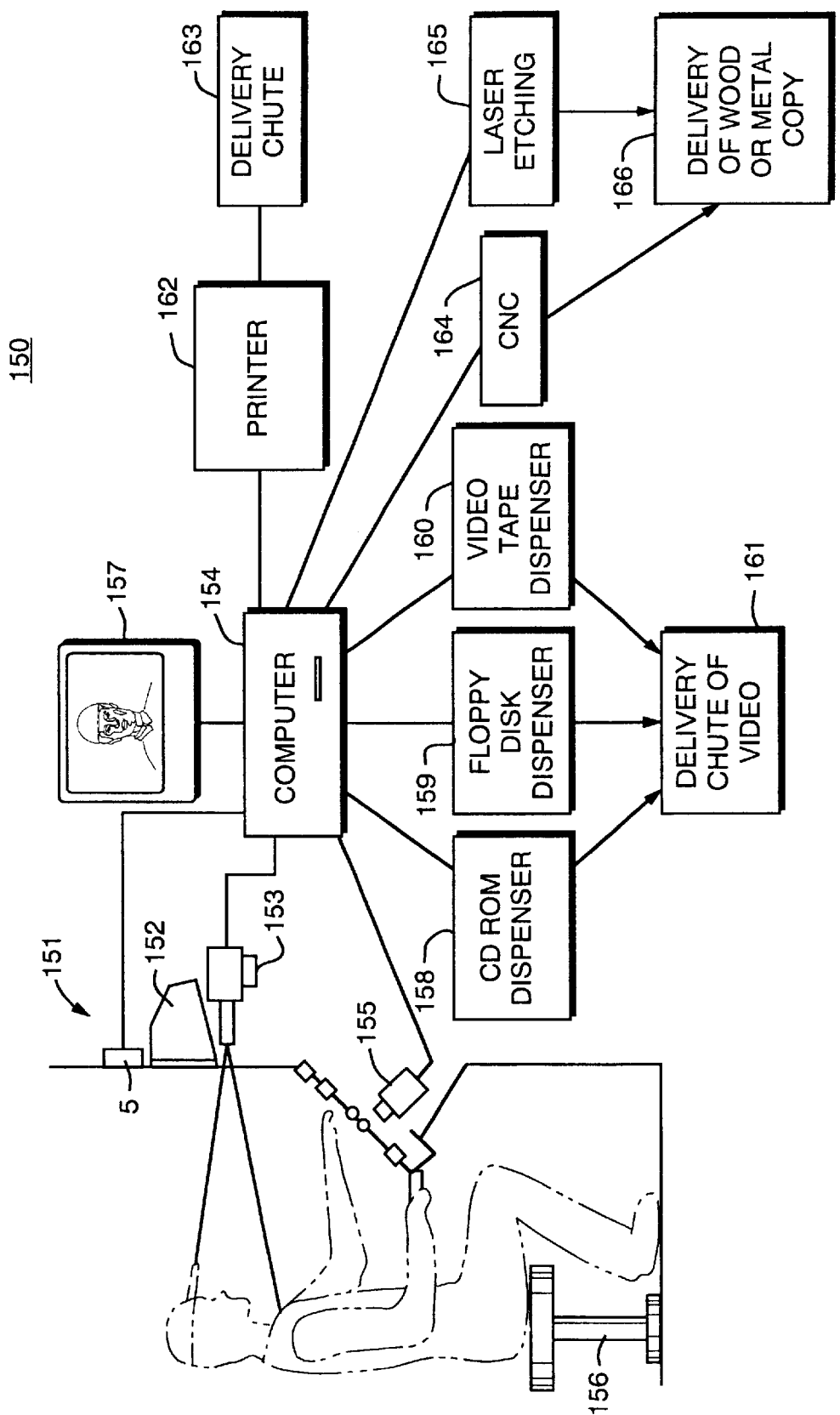
FIG. 2B is a schematic diagram of another photo booth which accomplishes this invention.

FIG. 2B is a schematic diagram of another embodiment of system 150 of this invention, which may be used to practice the method of this invention. Photo booth 151 has user-operated camera position and image selection buttons labelled 1–4, and money input device or credit card device 5 for enabling the system. A user sits on seat 156 and a portrait of the user is captured by video camera 153, whose input is provided to personal computer 154. Second video camera 155 is pointed at a glass plate (not shown) to capture an image of a still photograph, as described above. User monitor 152 displays the appropriate image for viewing by the user, and second monitor 157 displays the same image to others. System 150 includes the provision of a hard copy and/or an electronic copy of the mock image created by the system, and/or a video clip of the process by which the mock image was created, which the user can take with him and play back as desired by the user on a computer or VCR, to entertain the user. These recorded animation sequences can be created and dispensed on any available portable, machine-readable memory device media, such as CD ROM dispenser 158, floppy disk dispenser 159, and video tape dispenser 160, each of which would be delivered through chute 161. Another possibility would be the use of a modem to transmit an electronic file comprising a digital video clip of the image creation process.

System 150 also provides different types of hard copy output of the image created. Printer 162 can deliver a paper copy through chute 163. A copy could alternatively be engraved on a hard material such as wood, metal or plastic by CNC engraver 164, or etched with a device such as a laser etching machine 165, and delivered through chute 166.

Figure 6:
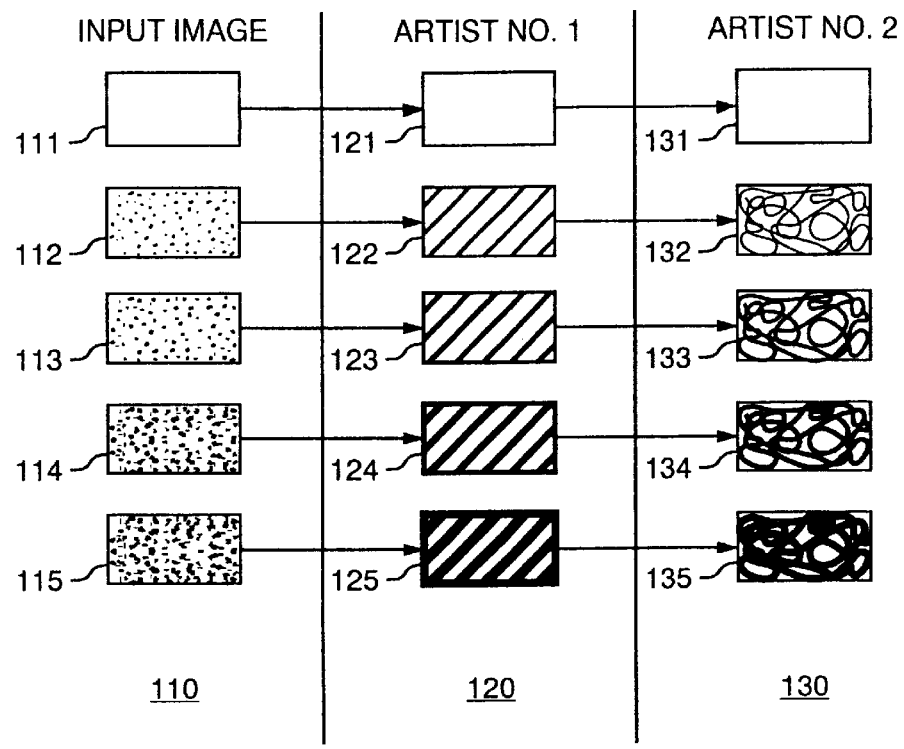
FIG. 6 is exemplary of two different manners of substituting the grey scale value of the input image with textures representative of two different artists, for use in this invention.

If the software is configured to generate and display on monitor 18 an icon which is used to simulate the drawing or painting of the mock output image of the caricature, the first step of the preferred method for accomplishing this simulation is to translate the electronically-stored image into instructions capable of creating the mock image. Software resident in the computer, in conjunction with the video board, is enabled to determine the grey scale value of each pixel of the electronically-stored caricature image. One or more display parameters other than grey scale (e.g. hue, RGB value, saturation) can be the parameter of the pixels for which a value is determined and used as set forth below. Grey scale will be used in the following discussion, but such does not limit the invention. The entire grey scale which may be recognized by the video system used has been previously divided into a number of groups. Preferably, these groups each represent contiguous portions of a digital grey scale spectrum. For example, with an eight bit video system, 256 grey scale values are supported. These 256 values can be divided into a number of groups. FIG. 6 displays five groups 111–115 in column 110. The size of, and grey scale values comprising, each group is a design choice, partially driven by the type of mock image output which it is for which a value is desired to create. Column 110 in FIG. 6 is meant to represent grey scale values of increasing darkness from value 111 to value 115. The software then assigns the appropriate grey scale group value to each pixel of the electronically-stored image.

The method of this invention preferably allows for more than one type of artistic style to be used in creating the mock artist's image. This can be accomplished as follows. A number of display textures for each type of mock artist style are input into the personal computer. This may be accomplished by manually sketching such textures, each of which represents a progressively darker drawing or painting area, and/or a particular color for a color output. These different textures are then scanned into a computer and digitized to create instructions that are necessary to accomplish an output on the monitor which is representative of the scanned texture. FIG. 6 illustrates two groups of such scanned textures for two different artist styles, labelled "Artist Number 1" and "Artist Number 2", columns 120 and 130, respectively. The artist number 1 style is accomplished by a series of ever-thicker diagonal lines which create an ever darker shading effect. A similar effect is created in textures 131–135 in column 130 using thicker and/or more closely spaced curved lines and other drawing portions. There are limitless possibilities for the creation of texture areas having different darkness which can be scanned into the computer.

The next step in translating the electronically stored image into instructions capable of creating the mock image is to effectively substitute the stored display textures for the portions of the electronically-stored image having the appropriate grey scale values. This may be accomplished as follows.

Figure 7B:
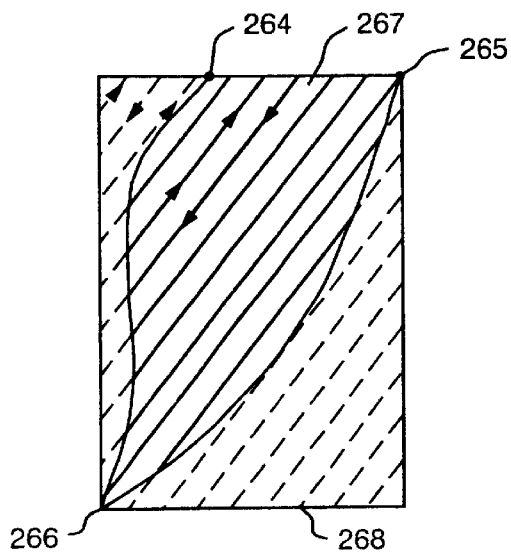
FIG. 7B is an enlarged schematic view of a portion of FIG. 7A, illustrating the path of the icon which simulates the creation of the mock image in the preferred embodiment of the method of this invention.
Figure 7A:
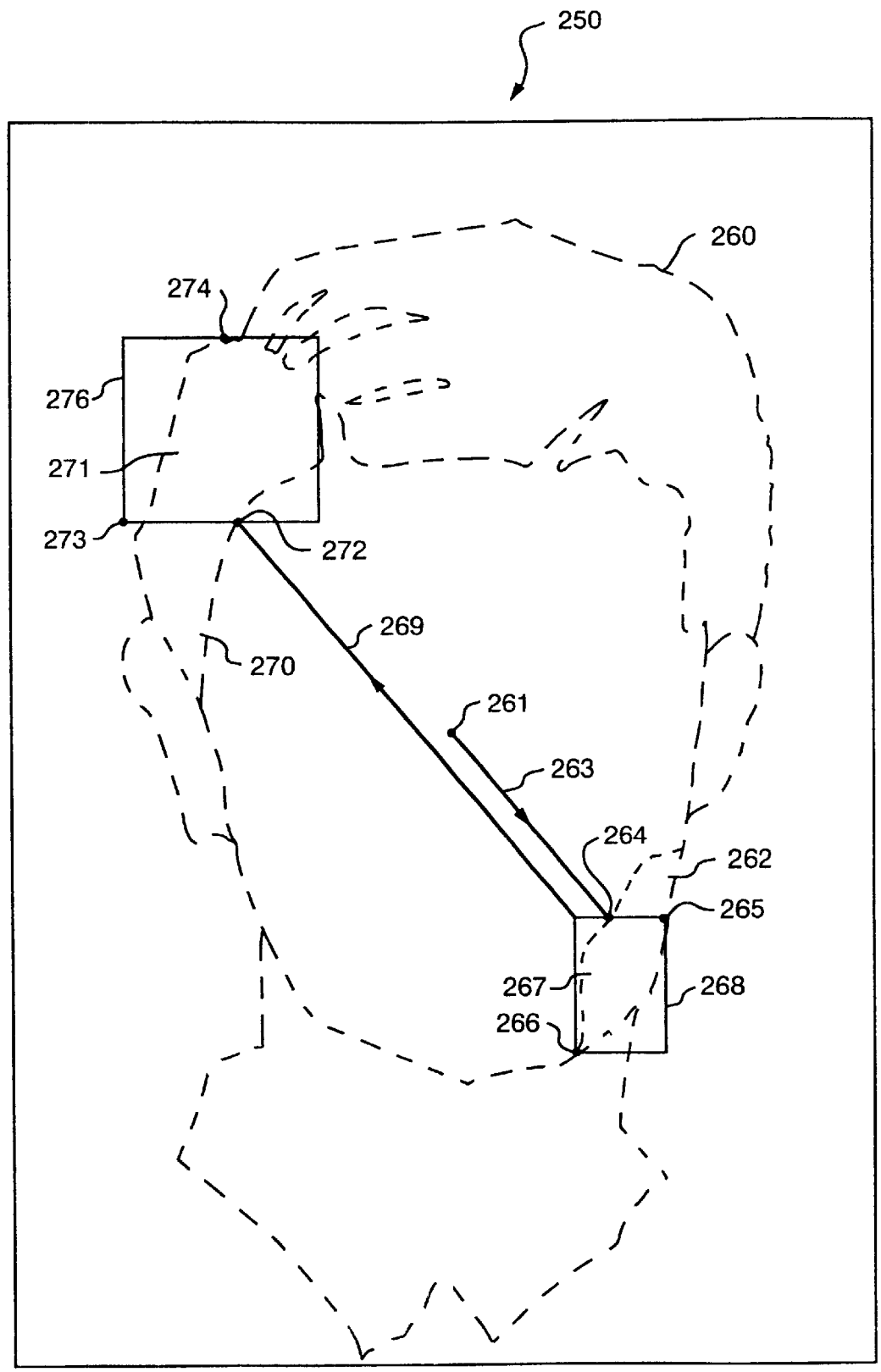
FIG. 7A is a more schematic representation of a portion of a displayed mock image, which is helpful in illustrating the preferred manner in which the image of this invention is created by the method of this invention.

With reference to FIG. 7A, image area 250 bounded by the large rectangle includes image 260 (shown in phantom), which is the outline of a portrait. Image 260 is not the actual image created on the monitor by the method of this invention, but is merely an illustration of a portion of an image which is useful in explaining the preferred manner in which the correct textures are applied to areas of the image, and created on the monitor.

Presuming that artist number 1 has been selected by the user, textures 121–125 are available for use. As described above, the computer has previously been programmed to substitute one of textures 121–125 for different portions of the grey scale spectrum of the electronically-stored image. The creation of the mock image on the monitor is accomplished as follows, with reference to FIGS. 7A and 7B. Operation begins at the center 261 of image area 250. A pointer (not displayed) is effectively moved diagonally down to the right along path 263 from center 261 at 45° from the horizontal, until the first pixel having a grey scale value in the range of the first texture (texture 121 when artist number 1 has been selected) is encountered. The procedure can start with any one of the textures, and does not have to proceed from lightest to darkest as will be explained below. This first pixel is illustrated as pixel 264 of contiguous image area 262 having pixels with grey scale values in the selected range. The pointer is then caused to move horizontally to the right until it stops encountering pixels in the grey scale range for the selected texture 121. This last contiguous point having a grey scale in that range is labelled 265 in the drawing. The pointer then drops down to the next row of pixels and traverses horizontally to the left, continuing until it hits the last contiguous pixel having a grey scale value in the selected range. From that point, the pointer again drops down and traverses to the right. Operation continues in this fashion until no more adjacent pixels having the correct grey scale value are found, labelled point 266 in the drawing. The software then draws a virtual rectangle around area 267 which has been traversed, with the first point establishing the upper side of the rectangle, the last point establishing the lower side, and the right most and left most points establishing the right and left side of the rectangle, respectively. By this fashion, portion 267 of larger area 262 composed entirely of pixels having grey scale values in the selected range is identified. This area 267, and virtual rectangle 268, are shown enlarged in FIG. 7B.

The software then accomplishes the gradual display of area 267 on the computer output device. This is accomplished as follows, with reference to FIG. 7B. The drawing icon is positioned on the screen so that the end of the drawing implement is at the upper left hand corner of rectangle 268. The icon is then moved back and forth across diagonal lines shown by the broken lines in FIG. 7B. When a side of rectangle 268 is encountered, the pointer moves one pixel to the right or down, as appropriate, reverses direction, and traverses again. The end result is that the icon moves diagonally up and down across the entire area of rectangle 268, imitating the diagonal movement of the drawing implement which may be accomplished by an artist filling in an area with a particular texture. When the icon encounters pixels within area 267 which is to be shaded with the texture chosen to represent the grey scale range of the pixels within area 267, the software enables the monitor to display the texture along the path which the icon traverses. This displayed texture is indicated by the solid lines within area 267. The result is the application of the scanned texture to area 267 in a gradual fashion filling from the top left hand corner to the bottom right hand corner of rectangle 268. To an observer, this process appears as though the icon is drawing the texture in area 267, filling from the top left to the bottom right of the area being drawn, and leaving appropriate drawing lines which create the texture. This embodiment simulates a drawing process by a right handed artist. To simulate a left handed artist, the filling of the texture would be from the top right to the bottom left.

Once the displayed portion 267 is accomplished, the pointer moves to the top left hand corner of rectangle 268 and proceeds diagonally up along path 269 (parallel to path 263) until it encounters another pixel having a grey scale value in the selected range, labelled pixel 272, FIG. 7A. Since the pointer is moving up, the horizontal traversing which identifies area 271 to which will be applied the selected texture proceeds left to right and up, in the same fashion described below for area 267. Area 271 and encompassing rectangle 276 are created in the same fashion, and area 271 is filled with display texture in the same fashion as described below in relation to area 267. When display area 271 has been created, the pointer moves to the bottom right hand corner of rectangle 276 and proceeds diagonally downward to the right until it hits the next pixel having a grey scale value in the selected range. Operation proceeds in this fashion until each pixel in image 260 having a grey scale value in the selected range has been displayed on the monitor with the appropriate texture. Each of the other textures would then be applied to the image in the same fashion. The end result is that the icon moves across display 250 in an interesting and apparently somewhat random fashion, filling in small or large areas with different textures, until the entire image is created. Although in software image 260 can be created in mere seconds, the icon is typically enabled to move at a relatively slow speed such that most images take minutes to create, which accomplishes the entertainment value associated with the invention.

A simplified form of a completed image 200 is shown in FIG. 8. Image 200 has area 202 with the lightest texture, area 204 with the next darkest texture, area 206 with the next darkest texture, area 208 with the next darkest texture, and area 210 with the darkest texture. The software can also create on the output artist's "signature" 216, which helps to personalize the output. The signature is associated with the user-selected artist style and drawing icon. Also displayed in image 200 is drawing icon 212 which in this case is an artist's hand holding a pencil. Also displayed is observer icon 214 which could be an animal or a person, for example. Observer icon 214 may be placed to increase the entertainment value of this invention. Icon 214 is meant to simulate observers whom often observe and comment on live drawings by artists. Observer icon 214 can be simulated to make comments as the drawing is created, for example "you have captured the eyes well". In another embodiment, observer 214 can appear to reach up and make a mark on image 200. The drawing icon could then be enabled to appear to say "sorry about that", and produce an eraser and erase the mark, then continue with the drawing. There are endless possibilities for interaction between the drawing icon, the observer icon, and the actual observers of the process, limited only by the creative abilities of the programmer.

As a result, each caricature, and the process by which it is "created" on the monitor, is unique. There is thus entertainment value to the process. Any video clip of the process will be a unique cartoon movie, which has value. The video clip for each portrait will have a different duration, and the path the icon follows will be unique, because it is dependent on the shading of a particular caricature. Also, the observer icon comments can be selected randomly from a library of hundreds of different expressions. The time at which such comments are inserted into the drawing process may also be randomized.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method of creating a caricature of an image taken of or provided by a user at a photobooth, comprising the steps of, providing an image fixing device;

fixing said image at said photobooth with said image fixing device;

assigning a first set of control points at predetermined locations on said fixed image;

establishing a distance between said control points;

altering said distance between at least two of said control points;

defining a second set of control points which incorporates said altered distances; and rendering said caricature in a visible format using said second set of control points.

2. The method of claim 1, of creating a caricature of an image taken of or provided by a user at a photobooth, further comprising the step of creating a retrievable copy of said rendered caricature.

3. The method of claim 2, of creating a caricature of an image taken of or provided by a user at a photobooth, further comprising the step of delivering said copy to said user.

4. The method of claim 1, of creating a caricature of an image taken of or provided by a user at a photobooth, in which the rendering step comprises the steps of, providing a computer monitor;

translating said fixed image, in response to said second set of control points, into computer instructions capable of creating a mock artist's drawing or painting of said caricature on said computer monitor;

generating and displaying on said monitor an icon which simulates drawing or painting said mock artist's drawing or painting of said caricature; and using said instructions to move said icon about said monitor, wherein said mock artist's drawing or painting of said caricature is created gradually as said icon moves, to simulate the process by which said mock artist may draw or paint said caricature.

5. The method of claim 4 in which the translating step includes determining a display parameter value of pixels of the fixed image.

6. The method of claim 5 in which the translating step further includes dividing the determined display parameter values into groups.

7. The method of claim 6 in which said groups represent contiguous portions of a digital grey scale spectrum.

8. The method of claim 4 further including electronically storing a plurality of display textures for use in creating the caricature.

9. The method of claim 8 in which the translating step includes substituting said stored display textures for portions of the fixed image.

10. The method of claim 9 in which the using step includes displaying on said monitor said substituted display textures in the areas of the display corresponding to said substituted portions of the fixed image.

11. The method of claim 8 further including creating a plurality of visible textures.

12. The method of claim 11 in which electronically storing a plurality of display textures includes scanning said created textures into a computer memory.

13. The method of claim 10 in which displaying on said monitor said substituted display textures includes gradually creating on said monitor said substituted display textures.

14. The method of claim 13 in which gradually creating said substituted display textures includes moving said icon across said monitor in a predetermined movement pattern.

15. The method of claim 14 in which said predetermined movement pattern is accomplished in one area of the display corresponding to said substituted portions of the fixed image at a time.

16. The method of claim 14 in which gradually creating on said monitor said substituted display textures includes creating said display textures along the path on which said icon traverses the monitor, as said icon traverses the monitor.

17. The method of claim 4 in which the step of generating and displaying an icon includes providing and displaying a plurality of drawing icons, and providing a means for a user to select one said drawing icon.

18. The method of claim 4 in which said instructions capable of creating said caricature include division of said fixed image into a plurality of separate image areas, each said image area corresponding generally to contiguous image areas of approximately the same display parameter value.

19. The method of claim 18 in which using said instructions to move said icon across the monitor includes moving said icon across said monitor in a predetermined movement pattern.

20. The method of claim 19 in which said predetermined movement pattern is accomplished in said plurality of separate image areas, one said image area at a time.

21. The method of claim 1, of creating a caricature of an image taken of or provided by a user at a photobooth, in which the altering step includes the step of generating an inverse transform.

22. The method of claim 1, of creating a caricature of an image taken of or provided by a user at a photobooth, in which the rendering step comprises the steps of, electronically storing a plurality of display textures for use in creating the caricature;

translating the fixed image into instructions capable of creating said caricature, including determining a display parameter value for the pixels of the fixed image, and dividing the determined values into groups, in which said groups represent contiguous portions of a display parameter scale spectrum; and in which the translating step further includes substituting said stored display textures for portions of the fixed image;

generating and displaying on the monitor an icon which simulates drawing or painting the caricature; and using said instructions to move said icon across the monitor, wherein the caricature is created gradually as said icon moves across the monitor, to simulate the process by which an artist may create the caricature.

23. The method of claim 1, of creating a caricature of an image taken of or provided by a user at a photobooth, in which the rendering step comprises the steps of, electronically storing a plurality of display textures for use in creating the caricature;

translating the fixed image into instructions capable of creating said caricature, including determining the grey scale value of pixels of the fixed image, dividing the determined grey scale values into groups, and in which the translating step includes substituting said stored display textures for portions of the fixed image;

generating and displaying on the monitor an icon which simulates drawing or painting the caricature; and using said instructions to move said icon across the monitor, wherein the caricature is created gradually as said icon moves across the monitor, to simulate the process by which an artist may create the caricature, including displaying on said monitor said substituted display textures in the areas of the display corresponding to said substituted portions of the fixed image, and in which displaying on said monitor said substituted display textures includes gradually creating on said monitor said substituted display textures, and in which gradually creating said substituted display textures includes moving said icon across said monitor in a predetermined movement pattern, in which said predetermined movement pattern is accomplished in one area of the display corresponding to said substituted portions of the fixed image at a time, and further in which gradually creating on said monitor said substituted display textures includes creating said display textures along the path on which said icon traverses the monitor, as said icon traverses the monitor.

24. The method of claim 1, of creating a caricature of an image taken of or provided by a user at a photobooth, in which the rendering step comprises the steps of, translating the fixed image into instructions capable of creating said caricature;

using said instructions to gradually create the caricature on the monitor, in separate discrete portions of the monitor one at a time, to simulate the process by which an artist may create the caricature.

25. A photography booth for creating a printed output of a caricature comprising:

a printer;

a computer with memory;

means for storing a plurality of drawing textures;

means fixing an image at said photobooth;

means for assigning a first set of control points at predetermined locations on said fixed image;

means for establishing a distance between said control points;

means for altering said distance between at least two of said control points;

means for defining a second set of control points which incorporates said altered distances; and means for printing said caricature using said second set of control points.

26. A photography booth for creating an output of a mock artist's drawing or painting of a caricature, comprising:

a computer with memory;

means for storing a plurality of drawing textures;

means fixing an image at said photobooth;

means for assigning a first set of control points at predetermined locations on said fixed image;

means for establishing a distance between said control points;

means for altering said distance between at least two of said control points;

means for defining a second set of control points which incorporates said altered distances;

means for substituting one or more of said stored textures for different areas of said fixed image, in response to said second set of control points, to create an electronic mock artist's drawing or painting of said caricature; and means for creating a stored version of said mock artist's drawing or painting of said caricature, using said second set of control points, on a portable machine-readable memory device and delivering said stored version to the user as a record of said caricature.

27. The booth of claim 26 further including a monitor and a means for displaying on said monitor a gradual process of creating said caricature.

28. The booth of claim 27 further including means for creating a stored version of said gradual process on said portable, machine-readable memory device.

29. The booth of claim 26 further including means for dispensing to the user said portable, machine-readable memory device.

30. A photography booth for creating an output of a mock artist's drawing or painting of a caricature, comprising:

a computer with memory;

means for storing a plurality of drawing textures;

means fixing an image at said photobooth;

means for assigning a first set of control points at predetermined locations on said fixed image;

means for establishing a distance between said control points;

means for altering said distance between at least two of said control points;

means for defining a second set of control points which incorporates said altered distances;

means for substituting one or more of said stored textures for different areas of said fixed image, in response to said second set of control points, to create an electronic mock artist's drawing or painting of said caricature; and a hard copy output device and means for providing said electronic artist's drawing or painting of said caricature to said output device, using said second set of control points, to create a hard copy of said caricature.

31. The booth of claim 30 in which said hard copy output device is a computer printer, an engraver or an etcher.

* * * * *

UNITED STATES PATENT AND TRADEMARK OFFICE
CERTIFICATE OF CORRECTION

PATENT NO.    : 6,385,628 B1
DATED         : May 7, 2002
INVENTOR(S)   : Yefim Massarsky It is certified that error appears in the above-identified patent and that said Letters Patent is hereby corrected as shown below:

<u>Title page,</u>
Item [54], the word "IF" should read -- OF --.

Signed and Sealed this

Ninth Day of July, 2002

*Attest:*

*Attesting Officer*

JAMES E. ROGAN
*Director of the United States Patent and Trademark Office*